WILLIAM H. FLANIGAN.
Air Pump.

No. 125,037. Patented March 26, 1872.

Witnesses
Thomas J. Bewley
Isaac Rindge

Inventor.
William H. Flanigan
By His Attorney
Stephen Ustick 125,037

UNITED STATES PATENT OFFICE.

WILLIAM H. FLANIGAN, OF PHILADELPHIA, PENNSYLVANIA.

IMPROVEMENT IN AIR-PUMPS.

Specification forming part of Letters Patent No. 125,037, dated March 26, 1872.

Specification describing certain Improvements in Condensing Air-Pumps, invented by WILLIAM H. FLANIGAN, of the city of Philadelphia and State of Pennsylvania.

My invention consists of a series of cylinders confined to a revolving wheel on a stationary hollow shaft, and at radiuses with said shaft, in combination with another wheel carrying friction-wheels, in such a manner that, as the two wheels revolve together by means of gearing the friction-wheels, as they approach toward a position in line with the piston-rods, bear upon the cross-head of the rods, and force the air into the inner ends of the cylinders, and thence into the hollow shaft, and through one end of the same into a tank, in which it is condensed by the action of the pistons to be used in supplying an air-engine, or for other purposes. It will be seen that the pressure exerted upon the air is similar to that produced by two rolls running together, or like that produced by toggle-joint levers.

Figure 2:
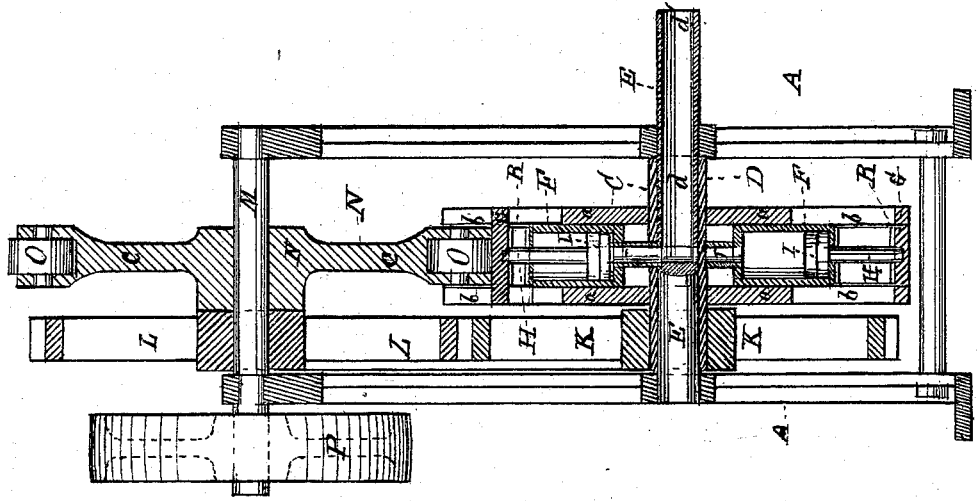
Figure 1:
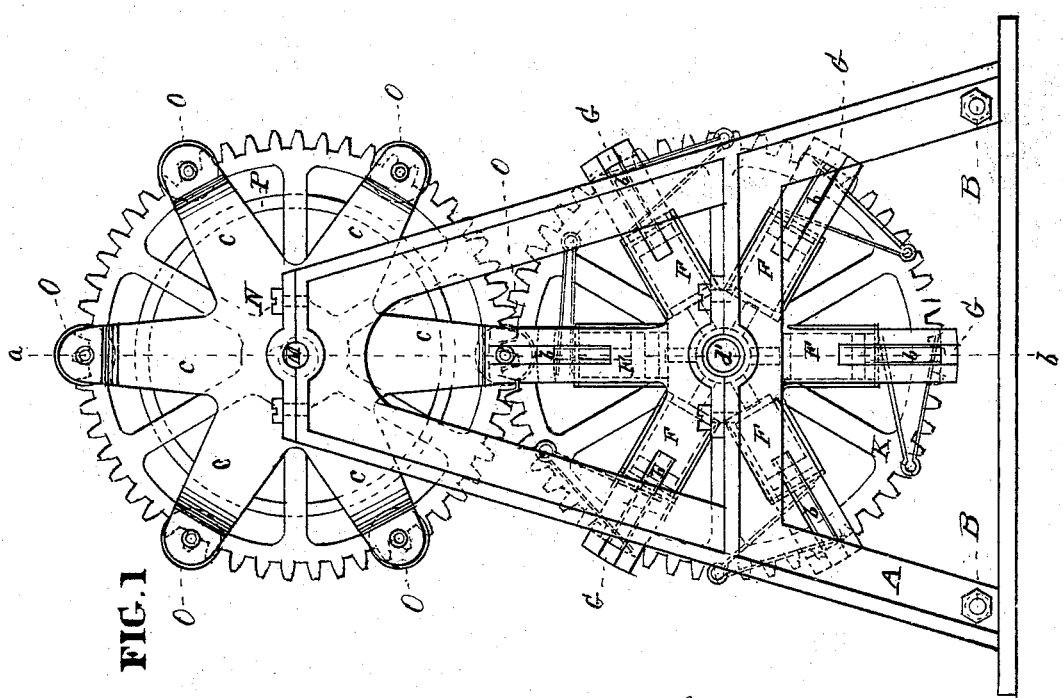

Figure 1 is a side elevation of the improved machine. Fig. 2 is a vertical section at the line $a\,b$ of Fig. 1.

Like letters in both figures indicate the same parts.

A A are the side pieces of the standing-frame, held together by means of the rods B B. C is a wheel on the tube or hollow cylinder D, which revolves on the stationary shaft E, whose ends are connected with the side frames A A. The said wheel is provided with air-cylinders F at radiuses with its center. They are confined between pairs of arms, $a$, of said wheel, which have slots $b$, that guide the cross-heads G of the rods H of the pistons I. The cylinders, by means of the short pipes J, communicate with the central bore $d$ of the shaft E, at the upper side of the same, vertical, or nearly so, with the center of the shaft, the bore having an outlet, $d'$, at one end of the shaft, for the passage of the air into a tank, not shown in the drawing. The air is used from the condensing-tank to drive an engine, or for other purposes. K is a gear-wheel, which also has a permanent connection with the tube or cylinder D, so as to turn with the wheel C. With said wheel K is geared the wheel L on the revolving shaft M. The shaft is also provided with the wheel N, which has radial arms $c$, whose outer ends are provided with friction-wheels O. There being the same number of friction-wheels as there are cylinders on the wheel G, and being placed equidistant apart, and the gear-wheels K and L being of equal diameter, and power being communicated to the shaft M by means of a belt over the pulley P on one end of the shaft, or by other means, it will be seen, when the two wheels are set so as to bring one of the friction-wheels O and one of the piston-rods H in line with the stationary shaft E and the revolving shaft M, that the friction-wheels will be successively brought to bear upon the series of cross-heads G, so as to condense the air in the cylinders F as the wheels C and N revolve; and that, as the action of the friction-wheels on the cross-heads as the two wheels revolve together, and the friction-wheels and pistons are brought in line with the shafts E and N, a similar pressure is produced to that of a pair of rolls; and also like that of toggle-joint levers, the power produced is immense, making the machine very effective in forcing the air into the tank. The air is admitted into the cylinders F at their outer ends by the pistons I, being withdrawn successively after the pressure by the action of the double springs R, one end of which being connected with the outer end of a cylinder, and the other end with the inside of the cross-head G of its piston-rod H. Instead of these springs, spiral or other springs may be used. When spiral springs are used, they may be placed on the piston-rods between the cross-heads and the ends of the pistons.

I claim as my invention—

A series of air-cylinders, F, on a revolving wheel, C, at radiuses with the frame, in combination with the stationary hollow shaft E and revolving shaft M, provided with friction-wheels O, the said wheels being caused to revolve together, substantially in the manner and for the purpose set forth.

WILLIAM H. FLANIGAN.

Witnesses:
  STEPHEN USTICK,
  J. W. HAMPTON, Jr.